United States Patent

[11] 3,568,063

[72] Inventor Earl F. Brown Piscataway, N.J.
[21] Appl. No. 812,714
[22] Filed Apr. 2, 1969
[45] Patented Mar. 2, 1971
[73] Assignee Bell Telephone Laboratories Incorporated Murray Hill, Berkeley Heights, N.J.

[54] SLIDING SCALE PREDICTIVE CODING SYSTEM
10 Claims, 7 Drawing Figs.

[52] U.S. Cl. 325/38, 325/41, 178/6BWR, 179/15 SIG, 179/15APC
[51] Int. Cl. H04b 1/00, H04b 7/00
[50] Field of Search 325/38, 38.1, 38 (A), 41, 42; 179/15 (SIG), 15 (APC), 15.55; 178/6 (BWR), 68, (Inquired)

[56] References Cited
UNITED STATES PATENTS

| | | | |
|---|---|---|---|
| 2,974,195 | 3/1961 | Julesz | 178/6BWR |
| 3,026,375 | 3/1962 | Graham | 179/15APC |
| 3,090,008 | 5/1963 | Mounts | 179/15APC |
| 3,422,227 | 1/1969 | Brown | 325/38 |
| 3,439,753 | 4/1969 | Mounts et al. | 325/38 |
| 3,497,624 | 2/1970 | Brolin | 179/15APC |

*Primary Examiner*—Robert L. Griffin
*Assistant Examiner*—Albert J. Mayer
*Attorneys*—R.J. Guenther and E.W. Adams, Jr.

ABSTRACT: A sliding scale coding system is disclosed which effectively extends the range of the quantizing circuit in a predictive coder by automatically inserting extra samples when changes in the input signal exceed a predetermined level. The extra samples are quantized and transmitted in succession with the regular samples. At the receiver the extra samples are detected and reconstructed in proper order with the regular samples. Filter circuits then add the extra samples to the regular samples in order to reconstruct the original input signal.

INVENTOR
E. F. BROWN
BY Leonard A. [signature]
ATTORNEY

TRANSMITTER

SLIDING SCALE PREDICTIVE CODING SYSTEM

This invention relates generally to pulse code communication systems and, more particularly, to apparatus in such systems that operates to reduce the bandwidth required to transmit the information pulse train.

In well-known pulse code, or digital, communication systems the analogue information signal is encoded, transmitted over a time divided transmission facility and then decoded at the receiver. In the encoding process the analogue information signal is first sampled at a fixed rate, known as the Nyguist rate, which is twice the frequency of the highest frequency component in the analogue signal. The amplitudes of these samples are then approximated by a number of discrete values, called quantum levels, so that each sample may be transmitted as a time divided pulse code. At the receiver, the quantized samples are reconstructed from the pulse code and the analogue information signal is in turn reconstructed from the samples.

So long as a sufficient number of quantum levels are used to approximate the analogue samples in the above process no objectionable amount of distortion is introduced into the transmitted information code. It may be appreciated, however, that the larger the number of quantum levels, the larger the number of code pulses that are needed for transmission. It is the number of code pulses that determines the required pulse rate and the bandwidth of the digital system.

Many predictive coding schemes have been proposed for reducing the number of pulses that must be transmitted to describe a given analogue signal sufficiently. In these systems the actual values of the quantized samples are not encoded for transmission. Rather, the past samples are used in various ways to predict the value of the present sample and only the error or difference sample is encoded. Since the amplitudes of the error samples are generally less than amplitudes of the original samples, fewer quantum levels and therefore fewer code pulses are needed in the transmission process. In effect, the predictive systems are more efficient because they omit nonessential or redundant portions of the original signal.

For the most part the average television picture is particularly well suited to predictive coding schemes. Generally this is so because each scan across the picture, which corresponds to one digital frame, will contain a great degree of redundancy from one point to the next. Unfortunately, however, the above is not true at the vertical edges of the objects in the picture. Often at these points the picture changes from light to dark or vice versa, causing a relatively large change in the corresponding video signal. As a result, large error samples are produced and a difficult coding problem is presented. If the large error samples are not accounted for, for example, the edges of the objects become blurred, thereby producing a smearing effect on the entire picture.

U.S. Pat. 3,422,227, issued to E.F. Brown on Jan. 14,1969, disclosed a predictive coding scheme which expands the quantizer scale whenever an error sample exceeds a predetermined threshold. In that coder the quantizer circuit contains two scales, one referred to as the n-scale and another referred to as the *m*-scale. In normal operation only the *n*-scale of the quantizer circuit is used. When more information is required, as for example at the edges of the objects, the *m*-scale are used. The additional information is transmitted during the horizontal retrace time in each digital frame of the picture. As may be appreciated, this system eliminates the smearing problem that is described with respect to the more simple predictive systems described above. Its disadvantage, however, is that a relatively complex quantizing circuit which is capable of distinguishing between $n+m$ levels is required. In addition, relatively complex apparatus which is capable of signaling the receiver and responding to the m codes is also required.

It is the object of the present invention to improve upon prior predictive systems by providing additional information during large changes in the information signal without the use of complex signaling apparatus and without the use of a relatively complex quantizer circuit that requires a differentiation among a great number of quantum levels.

SUMMARY OF THE INVENTION

The particular type of predictive coding system which is to be considered with the present invention is known in the art as a direct feedback, or error feedback, system. In a direct feedback system a first filter, known as the preemphasis filter, differentiates the original analogue signal to emphasize changes and to reduce the redundant portions of it. The signal at the output of the first filter is then sampled and passed to a coder circuit through a summing circuit, a second filter, or accumulator, a second sampling gate, and a quantizer circuit. The output of the quantizer circuit is fed back directly for subtraction from the sampled output of the first, or differentiating, filter circuit. The name "error feedback" or "direct feedback" comes from this direct feedback path from the quantizer circuit.

The second filter circuit in the forward path of the feedback loop is an integrator circuit which has a relatively long time constant to minimize low-frequency noise at the price of increasing high-frequency noise. This exchange of the type of noise is subjectively a good one in video systems because low frequency noise appears as a streak across the picture, whereas high frequency noise appears as relatively unobjectionable snow. Because of its long time constant the second filter accumulates the individual errors that result from the subtraction of the quantized output samples from the samples at the output of the differentiating filter. The second sampling gate operates in synchronism with the first sampling gate to feed samples of accumulated error to the quantizer circuit.

The negative feedback signal from the quantizer insures that the accumulated error is maintained at a low level during the redundant portions of the signal. When a large change occurs in the analogue signal a large change also occurs in the differentiated signal at the output of the first filter, thereby producing large samples in the first sampling gate. Since the level of the accumulator is normally maintained at a low level the initial feedback signal has little effect on the large sample from the first sampling gate. The addition of the resulting sample in the accumulating filter, therefore, tends to cause a large change in its output level. Since in normal operation the quantizer circuit is adapted to quantize only relatively small levels of signal, this large change is effectively clipped at the output of the quantizer circuit. Thus it may take several feedback signals from the quantizer circuit to diminish a single large change in the original analogue signal. This lag or "catching up time" of the quantizer produces the smearing effect indicated generally above.

To achieve the objects of the present invention and thereby reduce quantizer distortion in the digital signal, a sliding scale coding technique is used to encode the error samples that exceed a predetermined level. In normal operation each error sample from the accumulating filter in a direct feedback coder is quantized by a circuit which contains a minimum number of quantizing levels. Even with such a minimum number of levels the error samples are adequately quantized and encoded during redundant portions of the analogue signal. When the accumulated error exceeds a predetermined level a control signal is set back to the second sampling gate to take an extra sample from the accumulating filter at an interval prior to the next regular sample. Both the regular sample and the extra sample are fed back and encoded in regular order. At the receiver a filtering circuit is used to add the extra sample to the previous regular sample in order to produce the effect of a single large sample which reflects the large change in the analogue signal. It should be emphasized at this point that these extra samples are only taken when needed so that a quantizer with a minimum number of levels may be used in the regulator course of the coding process. Such a simple quantizer circuit may be produced most economically since the many levels of prior art systems are not required.

The use of extra samples taken at critical times during the analogue signal has dramatic effect on the operation of the system. Specifically, the quantizer which in normal operation may be quantizing error signals with a range of, for example, −D to +D, may then have an effective range of −2D to +2D by the addition of an extra sample. This effect occurs because of the accumulation of the error signals in the second filter. Since the extra sample has the benefit of the correction made by the feedback of the previous sample, it effectively represents the remainder of the error over and above that indicated by the quantized output from the regular sample. By transmitting and feeding back this remainder as an extra sample, the lag or "-catching up time" of the coder is diminished during large changes in the picture. Assume, for example, that the accumulated error at any given instance is +2D and that the quantizer circuit feeds back a signal equal to its highest level of +D during the regular sampling interval. Then the quantizer will also feed back a quantized output of +D during the extra sampling interval, thereby effectively encoding a change of +2D. As a result, the present invention operates simply and efficiently to encode the large changes that occur over the boundary regions in the picture.

The bandwidth needed to transmit the extra samples that are taken during critical portions of the analogue signal may be supplied in a number of ways. In one embodiment of the invention portions of the horizontal synchronizing signal are reserved. In such a case the actual number of extra samples that are used for each frame may be controlled by a counting device so that only the reserved bandwidth is used.

In another embodiment of the invention the bandwidth used for transmission of the extra samples is provided by omitting a previous regular sample from the transmitted signal. As indicated above, each extra sample occurs only during large changes in the analogue signal. In any sharp rise or fall of the analogue signal the sample taken between the beginning of the rise and the point where the extra sample is triggered may be interpolated with reasonable accuracy. This intermediate sample may thus be omitted from the transmitted signal and reconstructed at the receiver without undue distortion. In this manner each time an extra sample is transmitted to produce the sliding scale effect a regular sample is omitted so that no additional bandwidth is required.

DETAILED DESCRIPTION OF THE DRAWINGS

Figure 1:
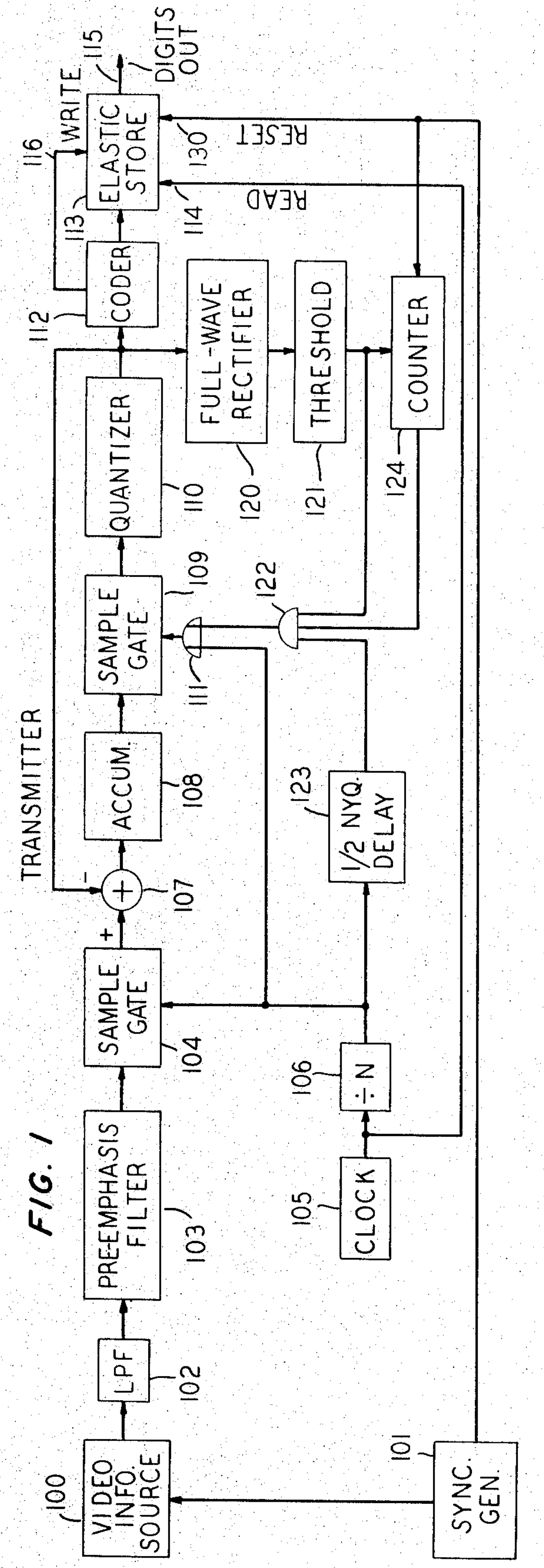
FIG. 1 is a block diagram of a transmitter circuit embodying the present invention.

A block diagram of a transmitter circuit using a direct feedback coding technique embodying the present invention is shown in FIG. 1. For purposes of illustration, video information source 100 is considered to carry a signal similar to the standard television signal used in the U.S. It should be kept in mind of course, that such an analogue information source may in general be voice or any information other than video.

In accordance with standard practice, each frame of the signal from source 100 corresponds to one scan across the picture, to be viewed on the television screen. A horizontal retrace interval occurs at the end of each frame to allow for the time when the scanning apparatus returns from the right-hand hand of the picture of the left-hand to begin a new frame. In addition, throughout the signal vertical retrace intervals occur periodically to allow for the time when the scanning apparatus ends the last scan at the bottom of one picture and begins a scan at the top of a new picture. Both the horizontal and vertical retrace intervals are blanked and marked by the signal from sync generator 101. During those intervals synchronizing pulses are inserted by generator 101 so that the receiver will be signaled when to begin the proper horizontal and vertical retrace.

The function of the transmitter shown in FIG. 1 is to encode the analogue signal from source 100 for transmission over a time divided transmission facility. In accordance with the invention extra information is to be encoded for transmitting at critical times during the analogue signal so that a minimum number of quantum levels my be used during the remainder of the signal.

The bandwidth required for the transmission of extra information may be reserved by a variety of techniques. Possibly the simplest method is to reserve a predetermined portion of the available bandwidth for transmission of the extra information. In the embodiment of the invention shown in FIG. 1, however, the system is considered to be running at full capacity with all available bandwidth being in use. In that event some usable bandwidth may be acquired by deleting nonessential portions of the horizontal synchronizing signal and transmitting only the leading edge of that signal to the receiver. So long as the leading edge of the synchronizing signal is detected in the receiver the remaining portion may be eliminated without loss of information. Thus, in the apparatus shown in FIG. 1, a predetermined number of extra samples may be transmitted in each frame with the bandwidth acquired by the deletion of nonessential portions of the horizontal synchronizing signal.

In FIG. 1, the signal from information source 100 is passed through low pass filter 102 to set an upper limit on the frequencies that are to be encoded. The upper limit of low pass filter 102 also determines the proper rate of sampling, known as the Nyquist rate. The signal from low pass filter 102 is applied by the way of preemphasis filter 103 to sampling gate 104. Filter 103, corresponding to the first filter in the direct feedback system described above, is essentially a differentiator circuit which emphasizes the changes in the signal from source 100.

A timing signal from clock 105 is applied by way of divide-by-N circuit 106 to sampling gate 104. Clock 105 produces pulses at the rate of the outgoing line of the transmitter shown in FIG. 1. Since each sample produces n code pulses, called bits, as a result of the coding process, the required line rate is determined by multiplying the Nyquist rate by N. In accordance with the embodiment of the invention shown in FIG. 1, three bits are used to encode each sample so that divide-by-N circuit 106 is specifically a divide-by-3 circuit. Clock 105 therefore sends pulses to circuit 106 at three times the Nyquist rate.

The signal samples at the output of gate 104 are passed by way of summing circuit 107, accumulator 108 and sampling gate 109 to quantizer circuit 110. Circuits 107, 108, 109 and 110 form the forward path of the feedback loop used in the direct feedback coder in FIG. 1. The quantized signal at the output of quantizer 110 is fed back and subtracted from the signal from sampling gate 104 at summing circuit 107. The difference signal at the output of circuit 107 is the error signal that is accumulated in circuit 108. Circuit 108, corresponding to the second filter in the direct feedback coder described above, is a long-time integrator which continually sorts the past difference signals at the output of circuit 107. The accumulated difference signal in circuit 108 is sampled by gate 109 and quantized in quantizer 110. Sample gate 109 operates at the Nyquist rate as determined by the signal passing through OR gate 111 from divide-by-N circuit 106. As may be appreciated, the larger the error signal that builds up in accumulator circuit 108 the larger the quantized error sample at the output of circuit 110 and the greater the negative effect added to the sample from gate 104. This negative reference on the feedback loop provides for stability since the error tends to correct itself. Thus, in the absence of large changes in the incoming signal the accumulated difference signal in circuit 108 is maintained at a minimum level.

The quantized error samples at the output of quantizer 110 are encoded in a three-bit code by coder circuit 112 and passed directly to elastic stone 113. Coder circuit 112 supplies a write signal to input 116 of elastic store 113 simultaneously with the code bits to register them into the store. Clock 105 provides a read signal to input 114 of elastic store 113 so that the digits are read at the proper rate on the transmission line at output 115. In normal operation elastic stone 113 is maintained at a constant level of storage since for each three bits read into elastic stone 113 three bits are subsequently read out at output 115.

When a large sample appears at the output of sampling gate 104, the difference signal at the output of summing circuit 107 will also be large, thereby causing a rise in the accumulated error signal in filter 108. If quantizer circuit 110 contains sufficient levels to quantize the large sample from accumulator 108, the initial feedback signal at circuit 107 will be sufficiently large to correct for the change in the accumulator and there will be no lag in the transmitted digital signal. If the large change is not sufficiently accounted for in quantizer circuit 110, an objectionable amount of distortion may be introduced in the transmittal signal. Assume, for example, that the video signal abruptly changes from black to white at a particular point in a scan across the television picture. Assume further that the peak quantizing level in quantizer circuit 110 is not sufficient to account for the large change appearing in accumulator circuit 108. Then the change at the output of quantizer circuit 110 does not immediately reflect the change occurring in the video signal. As a result, instead of a change being viewed from black to while, the change appears to the observer as a gradual change from black to gray to white, thereby producing the smearing effect indicated above.

Full wave rectifier 120 and threshold circuit 121 continuously monitor the signal at the output of quantizer circuit 110 to detect the occurrence of large changes in accumulator 108. The signal at the output of quantizer circuit 110 may be either positive or negative because the output of he differentiating filter may be reflecting either a positive or a negative change in the original analogue signal. Rectifier circuit 120 converts the signal appearing at the input of threshold circuit 121 to a positive value. When one of the extreme levels, either a positive or a negative level, of quantizer circuit 110 is triggered by the signal from accumulator 108, threshold circuit 121 is activated. The triggering of an extreme level in quantizer circuit 110 indicates that the error sample from accumulator 108 may in fact be too large for the quantizer and that an extra sample is required.

A sliding scale operation is performed in accordance with the present invention to determine to what extend the accumulated error signal exceeds the limits of quantizer circuit 110. To effect this operation the signal from threshold circuit 121 is applied directly to AND gate 122. In addition, a signal from divide-by-N circuit 106 is applied through delay circuit 123 to AND gate 122. The signal at the output of divide-by-N circuit 106 is delayed by one-half a Nyquist interval by delay circuit 123 so that the activating signal from threshold circuit 121 will cause sampling gate 109 to be operated at an interval between the regular sampling intervals.

The signal from threshold circuit 121 is also applied to counter circuit 124. Counter circuit 124 insures that the number of extra samples does not exceed the capacity available during the horizontal synchronizing interval so that all of the extra samples will in fact be transmitted during each frame. Counter circuit 124 provides an enabling signal to AND gate 122 until a predetermined count is reached. In an absence of an inhibiting signal from counter circuit 124, AND gate 122 is enabled so that an extra sample may be taken any time that threshold circuit 121 is activated.

Both the regularly occurring samples and the additional samples are continuously encoded and read into elastic store 113 at a rate determined by the rate of production of the code pulses in coder circuit 112. Clock 105 provides a read signal at input 114 to read the stored bits in succession out of elastic store 113 at the bit rate of the transmission line. As a result of the sliding scale operation described above, the level of storage of elastic store 113 temporarily increases during each frame. This increase in level of storage occurs because of the extra code bits that are produced from the extra samples. As indicated above, transmission time for these extra samples is provided by omitting nonessential portions of the horizontal synchronizing pulse at the end of each frame. A reset signal is provided by sync generator 101 at input 130 of elastic store 113 to reset the store for the beginning of the next frame. This reset signal occurs slightly before the end of a frame to insure that the leading edge of the horizontal synchronizing pulse has been transmitted. On the occurrence of the reset signal all remaining bits corresponding to encoded portions of the horizontal synchronizing pulse are cleared from the store. Since the omitted portion of the horizontal synchronizing pulse is not needed to synchronize the receiver, no information is lost by the reset procedure.

Figure 2:
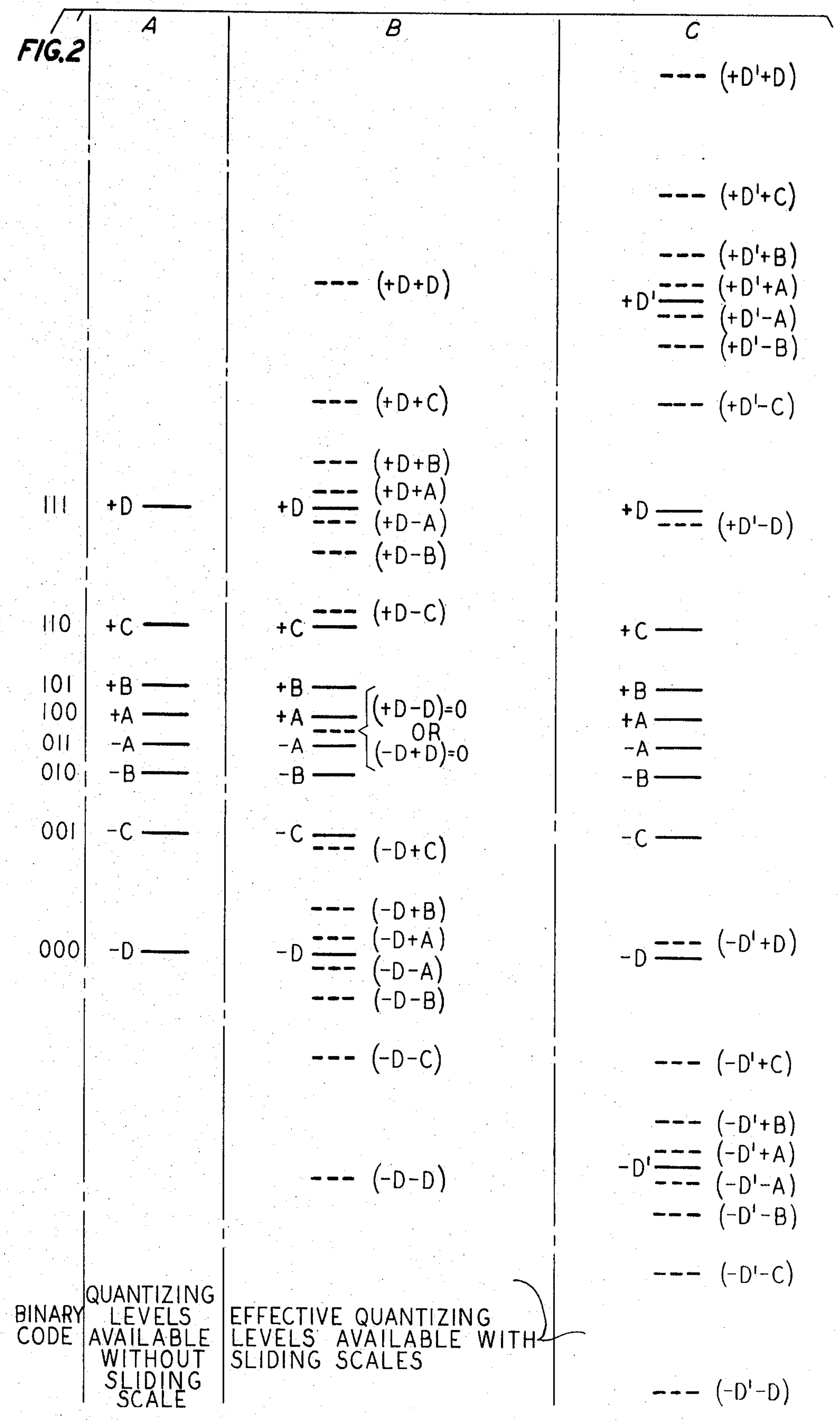
FIG. 2 is a chart showing the effective quantum levels that may be obtained through the use of the sliding scale coding technique in accordance with the present invention.

The effective quantizing levels made available in quantizer circuit 110 as a result of the sliding scale operation may be shown by reference to the chart shown in FIG. 2. Part A of FIG. 2 shows eight levels which are used to quantize the error samples taken at regular intervals. The varying distance between the levels merely reflects a standard companding procedure which seeks to minimize the percentage of quantization error over the entire scale. The scale contains both positive and negative values because the signal at the output of the differentiation filter will be both positive and negative. Each of the three-bit binary codes shown to the left of the levels in part A is the corresponding code that is produced when a quantized sample at each respective level is fed through coder 112. Part B of FIG. 2 shows how the range of quantizer circuit 110 is effectively doubled through the sliding scale operation described above. When an extra sample is taken the actual quantized value appearing at the output of quantizer circuit 110 has a value corresponding to one of the eight levels shown in part A of FIG. 2. The effective value of this sample, however, is determined by adding it to the previous regular sample which necessarily and an extreme level, either a+ D or a −D. Thus the eight levels of part A are added to levels +D and −D to determine the entire effective scale, shown in part B, that is available with the extra sample. As a result, changes from −2D to +2D may be accounted for in the coding process. The effective scale shown in part C of FIG. 2 is an alternative sliding scale which will be considered in detail below with reference to the coder embodied in FIG. 4 of the drawings.

Figure 3:
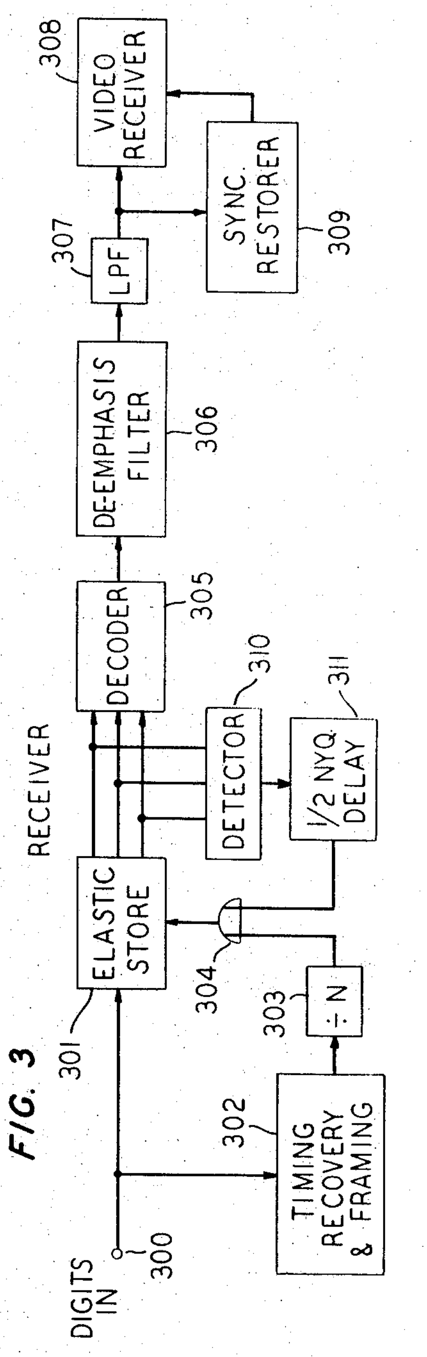
FIG. 3 is a block diagram of a receiver suitable for use with the transmitter shown in FIG. 1.

The digital signal from the transmitter shown in FIG. 1 may be transmitted by any of a number of well-known transmission facilities to input 300 of the receiver circuit shown in FIG. 3. The digital signal at input 300 in FIG. 3 is then transferred directly to elastic store 301 and timing recovery and framing circuit 302. Circuit 302 performs a function analogous to that of clock 105 in FIG. 1. That is, circuit 302 derives pulse rate information from the incoming digital signal in order to decode it at the Nyquist rate. Circuit 302 also derives framing information from the incoming signal so that each three-bit group, corresponding to each of the encoded samples from the transmitter, may be identified for the decoding process.

Elastic store 301 stores binary information at the bit rate of the incoming digital signal. The read signal for elastic store 301 is supplied from timing recover circuit 302 through divide-by-N circuit 303 and OR gate 304. Divide-by-N circuit 303 corresponds to divide-by-N circuit 106 shown in FIG. 1 is specifically a divide-by-3 circuit because three bits must be decoded to reconstruct one of the samples from quantizer 110 in FIG. 1. In response to each read signal, three bits are read simultaneously through three parallel leads from elastic store 301 to decoder 305. Because of proper framing in circuit 302 each three-bit group being read into decoder circuit 305 corresponds to a three-bit code group derived from the quantizer outputs in the transmitter shown in FIG. 1.

Decoder circuit 305 decodes each three-bit code group to reconstruct the original quantized samples. The reconstructed samples are then passed via deemphasis filter 306 and low pass filter 307 to video receiver 308. Filter 306 is a short time integrator circuit which is essentially the inverse of preemphasis filter 103 shown in FIG. 1. Low pass filter 307 smooths the e signal from deemphasis filter 306 to reduce the remaining sampling noise and reconstruct the original analogue signal. Video receiver 308 may be any of a number of video circuits well know in the prior art. Sync restorer circuit 309, connected to the output of low pass filter 307, detects the leading edge of each horizontal synchronizing pulse and restores the portion which was deleted at the transmitter. The restored synchronizing pulse is fed to video receiver 308 to maintain proper synchronization in the system.

In order to properly decode the extra information samples that were transmitted from the transmitter circuit shown in FIG. 1, detector circuit 310 and delay circuit 311 are utilized to trigger elastic store 301 at intervals between Nyguist intervals used for the regular samples. Detector circuit 310 is activated whenever the code bits appearing in the the three leads at the output of elastic store 301 correspond to one of the extreme levels of the quantizer circuit 110 shown in FIG. 1. As indicated in part A of FIG. 2, these codes are "111" and "000"corresponding to the +D and −D levels, respectively. Occurrence of either of these codes indicates that an extreme level of quantizer circuit 110 has been triggered and that an extra sample has been taken at the transmitter. Because of this, an analogous procedure must also be performed in the receiver circuit shown in FIG. 3. Specifically, when detector circuit 310 is activated a pulse signal is sent to the elastic store 301 via delay circuit 311 and OR gate 304. This signal at detector 310 is delayed in circuit 311 by an interval equal to one-half the Nyquist interval so that the read signal to elastic store 301 occurs midway between the regular read signals for normal operation of the receiver. This extra read signal corresponds to the extra sampling signal which was used to activate gate 109 and trigger the sliding scale operation in FIG. 1. Each of these extra read signals from detector 310 reads three bits to decoder circuit 305, thereby reconstructing the extra samples which were encoded in coder circuit 112 shown in FIG. 1. As a result, each of the extra samples transmitted is easily decoded along with the regular samples without complicated detection or signaling circuitry. Decoder circuit 305 simply receives the extra code bits and produces an extra sample at an interval between the two regular samples. The extra sample is effectively added to the previous regular sample by increasing the output of filter circuit 306. Thus in accordance with this invention the regular and the extra samples are combined to produce as large a sample as would have been produced had such an encoded sample been transmitted directly from the transmitter.

Figure 4:
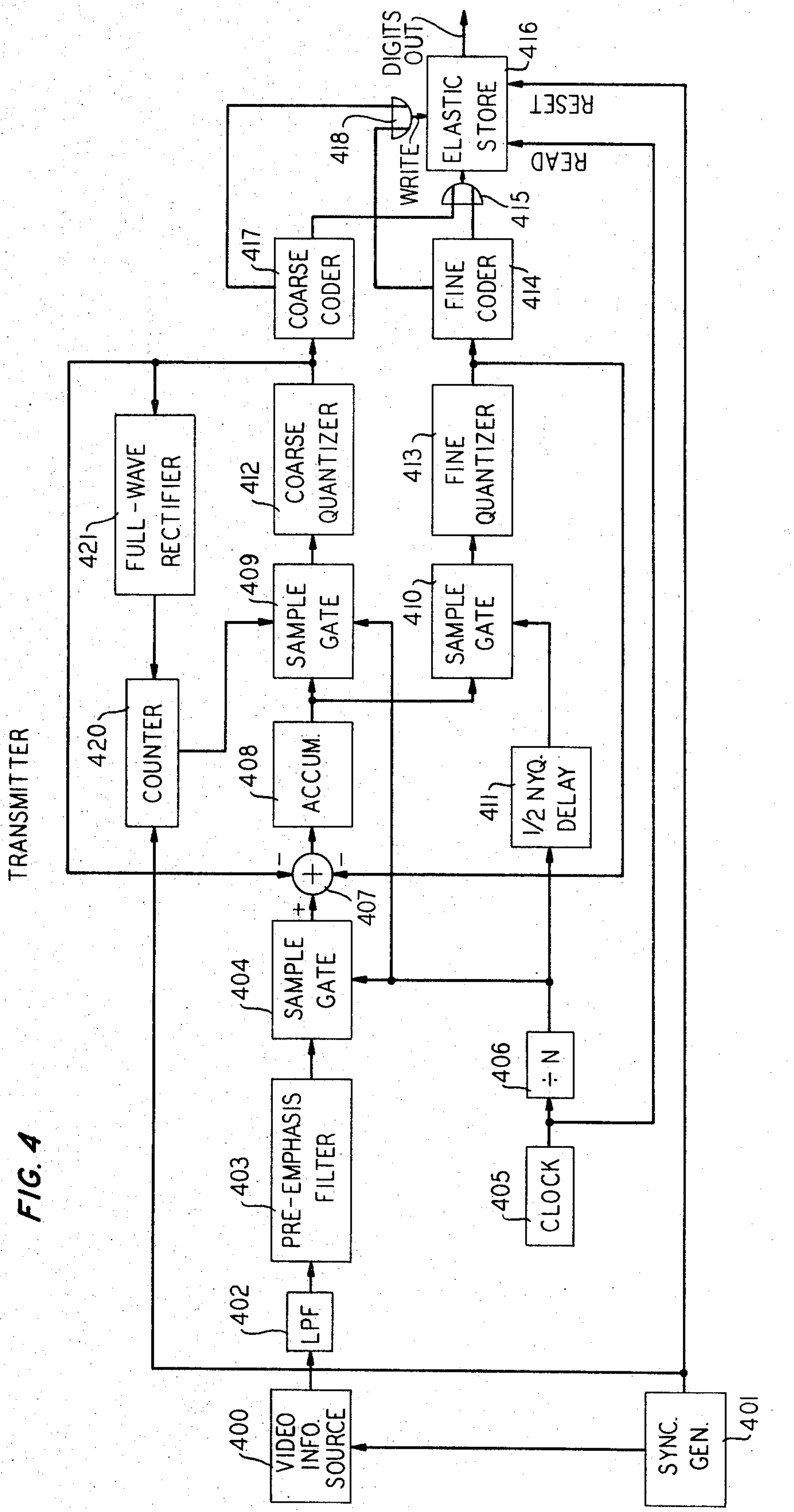
FIG. 4 is a schematic block diagram of a second transmitter circuit embodying the present invention.

Alternative transmitter apparatus embodying the present invention is shown in FIG. 4. Video information source 400, sync generator 401, low-pass filter 402, preemphasis filter 403, sampling gate 404, clock 405, and divide-by-N circuit 406 in FIG. 4 correspond to the identically labeled blocks shown in FIG. 1 having reference numerals three hundred numerals smaller. As in FIG. 1, the sample at the output of gate 404 is passed via summing circuit 407 to accumulator circuit 408. The accumulated signal at accumulator circuit 408 is sampled by both sampling gates 409 and 410. Sampling gate 409 is triggered directly by the signal at the output of divide-by-N circuit 406, while sampling gate 410 is triggered one-half a Nyquist interval later by the signal from circuit 406 after it has passed through delay circuit 411. The signal from sampling gate 409 is quantized by coarse quantizer circuit 412 and the signal from sampling gate 410 is quantized by fine quantizer circuit 413. Coarse quantizer circuit 412 contains only two levels which essentially correspond to the extreme quantization levels shown in part A of FIG. 2. Fine quantizer 413 contains a full set of eight levels such as those shown in part A OF FIG. 2.

In normal operation quantizer circuit 412 does not produce an output because the accumulated error is below the threshold of its two quantum levels. In such a case only the signal from fine quantizer 413 is read via fine coder 414 and OR gate 415 to elastic store 416. Coder 414 simultaneously sends a write signal via OR gate 418 to register the code bits in elastic store 416. The code bits from coder 414 correspond to those produced from the regular samples taken in the transmitter of FIG. 1. In the event that a large change occurs in the signal from source 400, the extreme levels of quantizer circuit 412 will register an output. This output is encoded in coarse coder 417 and registered in elastic store 416. When coarse coder 417 encodes a sample from quantizer circuit 412, a write signal is simultaneously sent through OR gate 418 to the write input of elastic store 416 in order to register the bits in the store.

A signal at the output of coarse quantizer 412 indicates that the sample from accumulator circuit 408 is at the extreme level of the quantizing scale provided. In such a case a sliding scale operation is required to increase the effective capacity of the coder. The sliding scale operation is accomplished in the embodiment of the invention shown in FIG. 4 by feeding the output of quantizer 412 back to adder circuit 407 prior to the sampling of the signal in accumulator 408 by sampling gate 410. The negative feedback signal from coarse quantizer circuit 412 lowers the level of the accumulated error signal in circuit 408. By this process, the error sample taken at the next regular interval is effectively the residue of the previous sample which was quantized in coarse quantizer 412. The previous sample from coarse quantizer 412 is encoded in coder 417 and transferred to elastic store 416 through OR gate 415. Subsequently, the regular sample from fine quantizer 413 is also encoded in coder 414 and passed through OR gate 415 to elastic store 416. Together both of these encoded samples may be added in the receiver to reconstruct the original large error signal that occurred at the time that quantizer circuits 412 and 413 were triggered.

As with the operation of the transmitter circuit shown in FIG. 1, the transmitter in FIG. 4 is controlled by clock 405 and sync generator 401. Clock 405 determines the pulse rate of the signal being read out of elastic store 416. Sync generator 401 sends a signal to elastic store 416 slightly before the end of each digital frame to reset the elastic store and prepare for the beginning of the next frame. The portion of each horizontal synchronizing pulse remaining in the store is deleted to provide for the extra samples taken during each frame. In order to limit the number of extra samples to the available bandwidth the output from coarse quantizer 412 activates counter circuit 420, through full wave rectifier 421. Counter circuit 420 counts the number of extra samples that may be sent within the interval supplied by each horizontal synchronizing pulse. Once a sufficient number of extra samples has been sent to use up the available bandwidth, counter circuit 420 sense an inhibit signal to sampling gate 409 to disable coarse quantizer 412.

The advantage of the coding scheme shown in FIG. 4 over that shown in FIG. 1 is that the additional coarse coder permits a wider distribution of the effective quantum levels available as a result of the sliding scale operation. Specifically, it may be observed with reference to part B of FIG. 2 that in the sliding scale operation for the transmitter of FIG. 1, a code combination of "111,000" or "000,111" produces effective levels in sliding scale equal to +D, −D and −D, +D respectively. both of these combinations correspond to a resultant quantum level that is equal to zero. Since such a level is meaningless, the effective scale of part B may be improved by using the above levels more constructively. In this connection, it may also be noted that the largest levels available in part B of FIG. 2 are equal to ±2D. By comparison, because of the employment of two coders, one fine one coarse, the two levels of coarse quantizer 412 shown in FIG. 4 may be adjusted to a value, denoted d' which is in excess of the magnitude of D' in fine quantizer 413. As a result, by the sliding scale operation the largest levels available are +D'+D, and +D'−D, as shown in part C of FIG. 2. In effect the simple scale shown in part A of FIG. 2 is now added to levels +D' and −D' rather than +D and −D. In addition the codes "111,000" and "000,111, corresponding respectively to effective quantum levels +D'−D and −D'+D, no longer have a magnitude of zero. The addition of magnitude D' in the feedback path from coarse quantizer 412 simply adds a larger signal at summing circuit 407. The next regular sample quantized in fine quantizer 413 is effectively added to this new level, ±D'. As a result, the zero level in sliding scale operation is eliminated and extra levels are effectively made available where needed so that larger changes may be accommodated.

It should be understood, of course, that with such a sliding scale operation with a coarse and a fine coder, any of the levels in the sliding scale shown in part C of FIG. 2 may be altered to encode the various samples more suitably. The threshold, or triggering, level for D',however, should always be at or below the threshold level of D so that sliding scale operation is effected whenever the regular sample exceeds range of the C level. Levels +D' and −D' are always transmitted by way of illustration by coarse coder as codes "111" and "000," respectively. Thus, either of these codes indicates that sliding scale operation has been effected, and that the next code reflects the value of the residue encoded by the fine coder.

Figure 5:
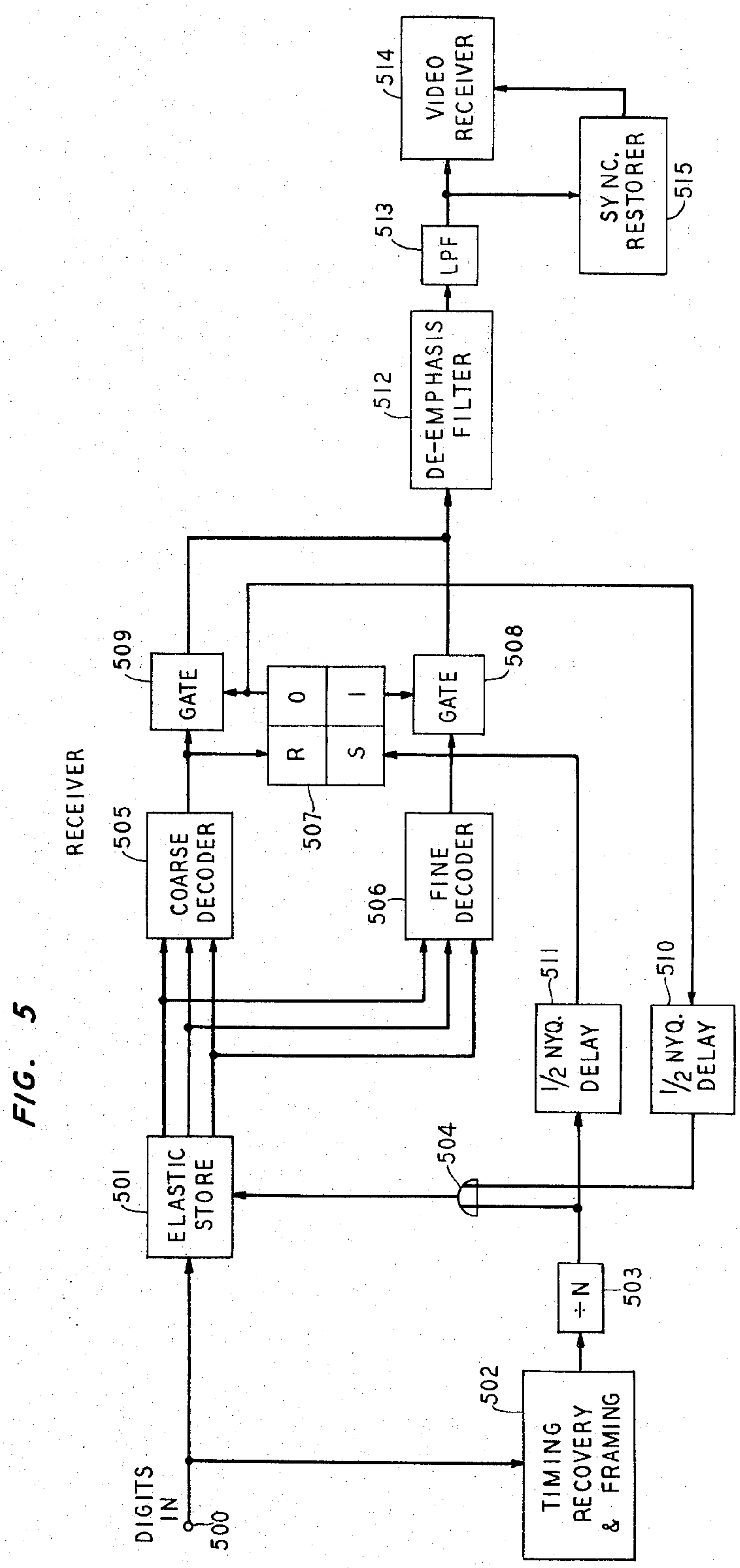
FIG. 5 is a block diagram of a receiver suitable for use with the transmitter of FIG. 4.

The digital signal from the transmitter circuit shown in FIG. 4 may be transmitted over any well-known time divided transmission facility to input 500 of the reciever circuit shown in FIG. 5. Initially the received signal is stored in elastic store 501. At the same time the signal is also passed through timing recovery and framing circuit 502 so that the clock rate and framing may be derived from the incoming data signal. Timing circuit 502 provides a read signal to elastic store 501 via divide-by-N circuit 503 and OR gate 504 to read out the stored signal in three-bit code groups. Each three -bit group appearing at the output of elastic store 501 is continuously monitored by coarse decoder 505 and fine decoder 506. Decoder 505 is adapted to produce an output signal only in the presence of code groups 111 and 000 corresponding to the codes transmitted from coarse coder 417. In normal operation these codes do not appear in the received signal so that only an output from fine coder 506 is passed directly through analogue gate 508 to deemphasis filter 512.

The appearance of code group 111 or 000 at the receiver activates coarse decoder 505. The occurrence of an output at coarse decoder 505 resets bistable circuit 507. This reset operation disables analogue gate 508, enables analogue gate 509 and causes an additional read pulse to be sent via delay circuit 510 to elastic store 501. Because gate 509 is enabled the analogue sample at the output of coarse decoder 505 is passed to deemphasis filter 512. One-half a Nyquist interval later a pulse from divide-by-N circuit 503 is passed via delay circuit 511 to the set input of flip-flop circuit 507. This set signal sets bistable circuit 507, again disabling gate 509 and enabling gate 508. At the same time the next code group. occurring as a result of the read signal from circuit 507, is decoded in fine decoder 506 and passed through gate 508 to deemphasis filter 512. If, for example, code groups "111" and "111"appear in succession, the first group produces an output in coarse decoder 505 and resets flip-flop 507. The output of decoder 505 is then passed through gate 509 to deemphaisis filter 512. The second code group is read out of elastic store 501 one-half a Nyquist interval later as a result of the reset operation in flip-flop 507. This code group is decoded simultaneously in both coarse decoder 505 and fine decoder 506. The outputs of both decoders, however, appear at the time when the next set signal appears through delay circuit 511. The set signal takes priority over a simultaneous reset signal so that only gate 508 is enabled and only the sample from fine decoder 506 is passed to deemphasis filter 512. Together the previous sample from coarse decoder 505 and the regular sample from fine decoder 506 are effectively added in deemphasis filter 512 to reproduce a large change corresponding to the +D'+D level in part C of FIG. 2.

The signal from deemphasis filter 512 is passed via low-pass filter 513 to video reciever 514. Low-pass filter 513 again minimizes the remaining sampling noise before the signal is passed to video receiver 514. Synchronizing pulse restorer 515 decodes the leading edge of the horizontal synchronizing pulses at the output of the low-pass filter 513 in order to restore the synchronizing pulse and maintain video receiver 514 in proper synchronism with the transmitter.

Figure 6:
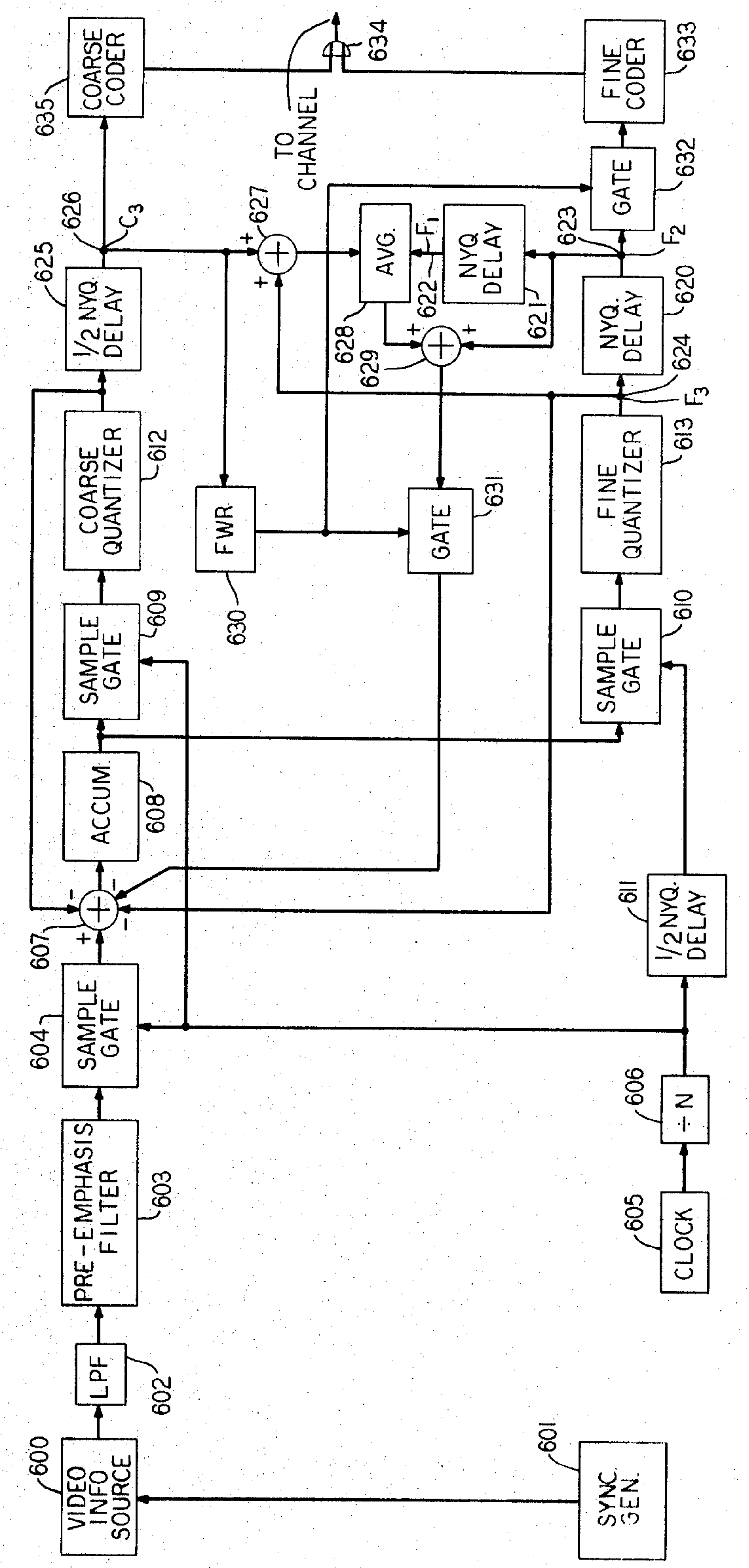
FIG. 6 is a block diagram of a third transmitter circuit embodying the present invention.

The transmitter circuit shown in FIG. 6 uses an encoding technique similar to that used in FIG. 4. In FIG. 6, however, the extra bandwidth needed to transmit the extra samples is acquired by omitting a previous regular sample each time the extra sample is transmitted. The transmitter circuit in FIG. 6, therefore, does not require the use of a storage device comparable to elastic stores 113 or 416. This follows since for each extra sample added one regular sample is immediately omitted so that, in sum total, no extra samples are transmitted. As described in detail below, the omitted sample is reconstructed at the receiver, shown in FIG. 7, by an interpolation procedure which uses the average value of the previous and succeeding samples.

In FIG. 6, blocks numbered 600 through 613 correspond to the similarly numbered blocks 400 through 413 in FIG. 4. Coarse quantizer 612 operates on the samples at the output of sampling gate 609 and fine quantizer 613 operates on the samples of the output of sampling gate 610. Sampling gates 609 and 610 continually sample the accumulated error signal in accumulator 608. Sampling gate 609 is activated at regular intervals at the Nyquist rate by the clock signal passing through divide-by-N circuit 606 from clock 605. Sampling gate 610 is activated one-half a Nyquist interval after gate 609 by the signal passing through divide-by-N circuit 606 and delay circuit 611 from clock 605. In normal operation, samples from accumulator circuit 608 have insufficient magnitude to trigger an output in coarse quantizer 612 so that only fine quantizer circuit 613 is activated. The output from fine quantizer 613 is then fed back to summing circuit 607 for subtraction from the next regular sample from preemphasis filter 603.

When the accumulated error in circuit 608 reaches a level sufficient to activate coarse quantizer 612, two operations must be performed. The first operation is to feed back the quantized output from coarse coder 612 to summing circuit 607 before the time that the next regular sample is taken. This operation is identical to that of coarse quantizer 412 in FIG. 4. The feedback signal from coarse quantizer 612 has the effect of sliding the scale for the next sample, quantized in fine quantizer 613, by an amount equal to the extreme level activated in coarse quantizer 612, as may be seen by reference again to part C of FIG. 2. The additional operation that must be performed is to delete the previous regular sample so that no extra bandwidth is required to transmit the sample from coarse quantizer 612. In deleting this regular sample, a correction must be made to accumulator circuit 608 so that succeeding samples will not be in error. For the most part, the remainder of the circuitry shown in FIG. 6 operates to delete the proper sample and make this correction to accumulator 608. At the receiver the deleted sample is reconstructed by interpolating between the preceding and succeeding samples as will be described in detail below.

The output from coarse quantizer circuit 612 indicates that a sliding scale operation is being effected and that the previous regular sample should be deleted. As may be appreciated, in normal operation the quantized value of the previous regular sample is fed back to summing circuit 607 for subtraction from the sample of filter 603. Since, in the sliding scale operation of FIG. 6, this previous regular sample is not to be transmitted and is therefore not precisely available in the receiver, a special correction must be made at circuit 607 The specific sample that is infact available at the receiver is the interpolated value between the preceding regular sample and the subsequent sliding scale sample. Objectionable distortion is avoided only when the recieved sample matches the feedback sample of the transmitter. Thus, it is this interpolated value that must be fed back to summing circuit 607. Otherwise, a low frequency error signal will be introduced at the receiver, causing streaking in the reconstructed picture.

To avoid this distortion the signal at the output of coarse quantizer 612 initiates an interpolation procedure at the transmitter. For illustration of this procedure assume that the regular samples from fine quantizer circuit 613 are passed successively through delay circuits 620 and 621, each of which has a delay equal to one Nyquist interval. Because of the effect of delay circuits 620 and 621 the three previous samples from fine quantizer 613 may be considered to appear coincident in time at point 622 at the output of delay circuit 621, point 623 at the output of delay circuit 620, and point 624 at the output of quantizer 613. As shown in FIG. 6, the three samples, designated $F_1$, $F_2$ and $F_3$, appear respectively at points 622, 623 and 624. Assume also that one-half a Nyquist interval prior to sample $F_3$ an output, designated $C_3$, appears at coarse quantizer 612. Thus, since sample $C_3$ from coarse quantizer 612 is delayed one-half a Nyquist interval by delay circuit 625, sample $C_3$ appears at point 626 at the same time that sample $F_3$ appears at point 624. This is also the same time that sample $F_1$ appears at point 622. Thus, since samples $C_3$ and $F_3$ are coincident, their sum appears at the output of summing circuit 627. This sum of samples $F_3$ and $C_3$ is averaged with the magnitude of sample $F_1$ in averaging circuit 628. Samples $C_3$ and $F_3$ together represent the magnitude of the sliding scale sample. Sample $F_2$ from fine quantizer 613, being the sample prior to the extra sample $C_3$, is the sample which is to be omitted in the transmission process. The interpolated value of $F_2$ is determined by taking the average of $F_1 + (F_3 + C_3)$. The error between the interpolated value and the actual value is then determined by subtracting the actual value of $F_2$ from the average value at the output of averaging circuit 628. This error is generated in summing circuit 629 by taking the magnitude of sample $F_2$ at point 623 from the average value appearing in average circuit 628. The resulting signal is passed to summing circuit 607 via analogue gate 631.

Full wave rectifier 630 rectifies the signal at the output of delay circuit 625 so that analogue gate 631 may be enabled and sample $F_2$ deleted at the proper instant. Whenever a sample appears at the output of delay circuit 625 from coarse quantizer 612, full wave rectifier circuit 630 enables analogue gate 631 to perform the correction described above. At the same time a signal is sent from full wave rectifier 630 to inhibit analogue gate 632 so that sample $F_2$ is not transmitted to fine coder 633. In the absence of an inhibit signal from full wave rectifier 630 all samples from fine quantizer 613 are passed via delay circuit 620 and analogue gate 632 to fine coder 633.

The samples from fine quantizer 613 are encoded at fine coder 633 and applied to the transmission line via OR gate 634. Whenever a sample appears at the output of coarse quantizer 612 the previous regular sample, which in the above example is sample $F_2$, is deleted. In that event the sample from coarse quantizer 612 is fed directly to coarse coder 635 and fed to the transmission line through OR gate 634. These code bits from coder 635 occupy the time interval previously reserved for sample $F_2$ because of the additional Nyquist delay incurred by the fine samples in delay circuit 620.

Figure 7:
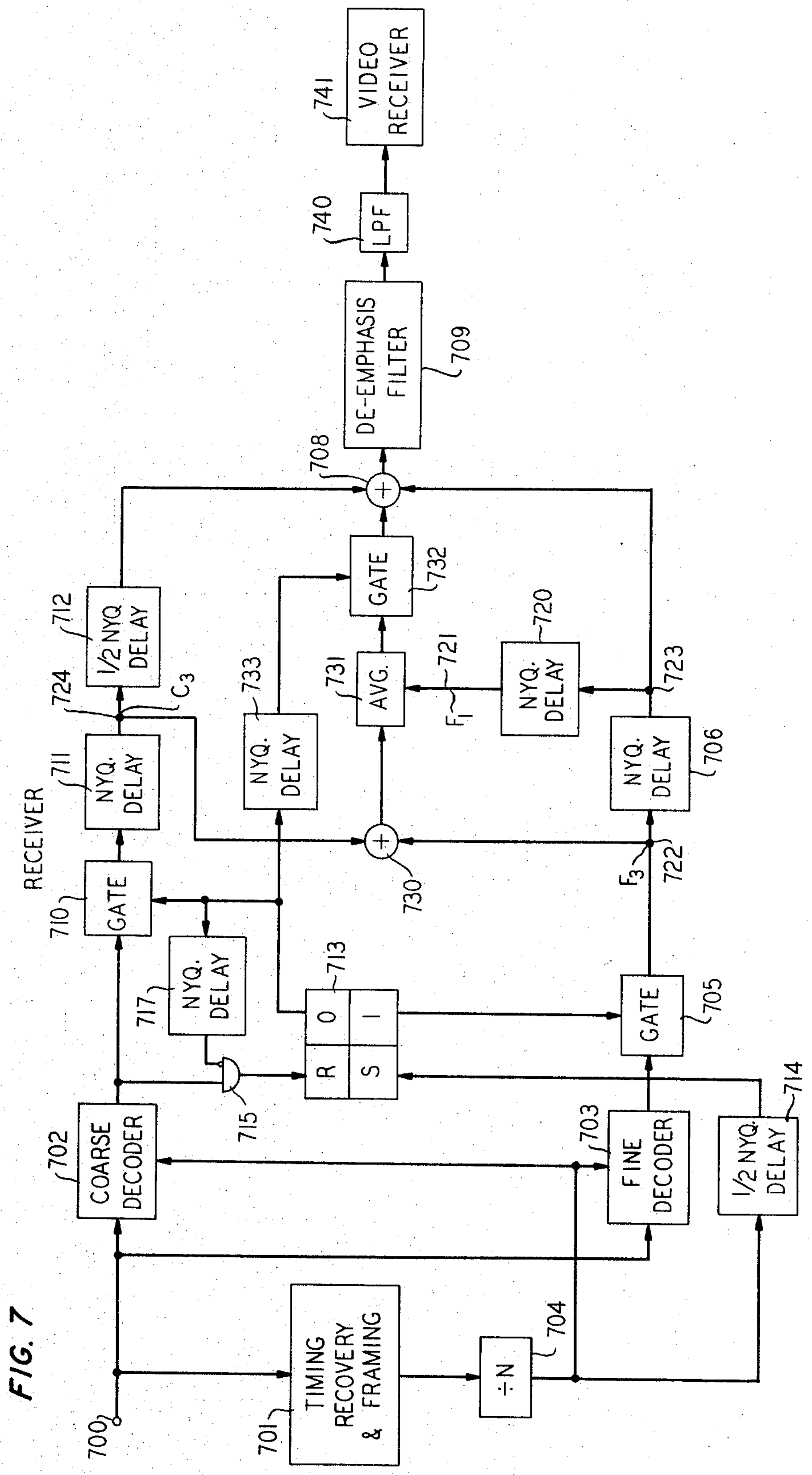
FIG. 7 is a block diagram of a receiver suitable for use with the transmitter of FIG. 6.

The digital signal from the transmitter shown in FIG. 6 is applied to input 700 of the receiver circuit shown in FIG. 7. The signal at input 700 is applied directly to timing recovery and framing circuit 701, coarse decoder 702 and fine decoder 703. Timing recovery and framing circuit 701 derives timing and framing information from the incoming data signal. The timing and framing information is applied via divide-by-N circuit 704 to both coarse decoder 702 and fine decoder 703 to decode each incoming code group at the Nyquist rate.

In normal operation the analogue samples from fine decoder 703 are passed via analogue gate 705, delay circuit 706, and summing circuit 708 to deemphasis filter 709. Coarse decoder 702 in normal operation does not produce an output because it recognizes only the codes corresponding to the extreme levels of the transmitted signal. As shown in FIG. 2, such codes are "111" and "000." In sliding scale operation samples from coarse decoder 702 are passed via analogue gate 710, delay circuits 711 and 712 and summing circuit 708 to deemphasis filter 709. Flip-flop circuit 713 controls analogue gates 705 and 710 in order to determine which decoded sample is passed to deemphasis filter 709. In normal operation flip-flop circuit 713 is maintained in a set condition so that gate 705 is enabled and gate 710 is disabled. This set condition is triggered by the signal from divide-by-N circuit 704 via delay circuit 714. Because of the one-half Nyquist interval delay of circuit 714, the set signal occurs after decoders 702 and 703 are activated.

As described above, when sliding scale operation occurs in the transmitter shown in FIG. 6 a coded sample from coarse quantizer 612 is transmitted to input 700 of the receiver circuit shown in FIG. 7. When a code corresponding to the code from coarse quantizer 612 appears in the digital signal an output appears at coarse decoder 702. This output resets flip-flop 713 via INHIBIT gate 715 . When flip-flop 715 is reset analogue gate 705 is disabled and analogue gate 710 is enabled. Enabling of analogue gate 710 permits the sample from coarse decoder 702 to be passed to deemphasis filter 709.

In sliding scale operation, a pair of code groups "111" and "111"following each other indicates that the coarse decoder is to be activated by the first group and that the fine decoder is to be activated by the second group to yield the levels +D′, D shown in part C of FIG. 2. In order to prevent the second code group from enabling gate 710 and permitting a second sample from coarse decoder 702 to be passed to deemphasis filter 709, a delay circuit is provided between output 716 of flip-flop 713 and INHIBIT gate 715. Each time that flip-flop 713 is reset a binary "1" appears at output 716 until flip-flop 713 is set again by the pulse from circuit 704. Delay circuit 717 has a delay equal to one Nyquist interval so that the next reset signal, appearing at the output of coarse decoder 702 one Nyquist interval after the first signal, is inhibited at gate 715. As a result, reset pulses are never produced in two successive Nyquist intervals. Accordingly, by such an arrangement flip-flop circuit 713 properly controls the samples from coarse decoder 702 and fine decoder 703. In the example above, with successive code groups of "111" and "111," the first sample is passed from decoder 702 through gate 710 and the second sample is passed from decoder 703 through gate 711. The remainder of the circuitry in FIG. 7 described below seeks to reconstruct the interpolated value of the omitted sample in the received signal and place the fine and coarse samples in their proper respective time intervals for filtering by deemphasis filter 709.

Assume for purposes of illustration that the incoming sequence of codes corresponds to the following samples: fine sample $F_1$, followed by coarse sample $C_3$ and fine sample $F_3$, each of these samples occurring one Nyquist interval apart. Fine sample $F_1$ will be passed through analogue gate 705, delay circuit 706 and delay circuit 720 to point 721. At the time, T, that fine sample $F_1$ appears at point 721 fine sample $F_3$, occurring two Nyquist intervals later, will appear at point 722 between gate 705 and delay circuit 706. Coarse sample $C_3$ does not appear at point 723 between delay circuits 706 and 720 because this sample is inhibited by gate 705 and transmitted by gate 710 through delay circuit 711. As a result, at time T coarse sample $C_3$ appears at point 724 at the output of delay circuit 711. Thus, at time T each of the three samples, $F_1$, $C_3$ and $F_3$, appears at the points shown in the receiver circuit in FIG. 7. As a result, at time T, samples $C_3$ and $F_3$ are added in summing circuit 730 and passed to averaging circuit 731. In addition, sample $F_1$ at point 721 is also supplied to averaging circuit 731. Thus, averaging circuit 731 produces the average of $(C_3 + F_3)+F_1$, which average is the interpolated value of the intermediate sample, $F_2$, omitted by the transmitter shown in FIG. 6. This interpolated sample is supplied via analogue gate 732 and summing circuit 708 to deemphasis filter 709. Analogue gate 732 is enabled at the instant that the correct interpolated sample appears in averaging circuit 731 because such a sample is always generated one Nyquist interval after an output appears in coarse decoder 702. When sample $C_3$ appears at the output of coarse decoder 702 to reset flip-flop 713, a signal is passed through delay circuit 733 to analogue gate 732. This signal occurs precisely one Nyquist interval after the triggering of coarse decoder 702 in order to pass the proper interpolated sample through analogue gate 732.

In the above illustration the samples from decoding circuits 702 and 703 will appear at deemphasis filter 709 in the following sequence. Sample $F_1$ appears first, followed one Nyquist interval later by interpolated sample $F_2$. Sample $C_3$ follows one-half a Nyquist interval later as a result of the delay incurred in delay circuit 712. Sample $F_3$ then appears one Nyquist interval after sample $F_2$ and one-half a Nyquist interval after sample $C_3$ as a result of the Nyquist interval delay incurred in circuit 706. This sequence corresponds to the originally transmitted sequence from the transmitter shown in FIG. 6 so that the samples may be properly filtered by deemphasis filter 709.

Deemphasis filter 709 is a short time integrator circuit indentical to filters 306 and 512 in FIGS. 3 and 5, respectively. Low-pass filter 740 again filters the remaining sampling noise in the signal before it is passed to video receiver 741. It may be noted that a synchronizing pulse restorer circuit is not required in the receiver shown in FIG. 7 because portions of the synchronizing pulses were not omitted from the transmitted signal.

In conclusion it may be seen that the above-described embodiments in the invention disclose a predictive coding system which effectively accounts for large changes at critical portions of the invention signal. It should be understood, of course, that such embodiments are merely illustrative of the principles of the invention and that various modifications may be effected by persons skilled in the art without departing from the spirit and scope of the invention.

I claim:

1. A transmission system comprising:
- a source of an analogue information signal;
- means for sampling said analogue signal at periodic intervals;
- means for obtaining an accumulated error signal by comparing the samples of said analogue signal with generated feedback samples;
- means for sampling said accumulated error signal at periodic intervals;
- means for quantizing said error samples to produce said feedback samples;
- means responsive to said accumulated error signal for generating an additional sample of said error signal when said error exceeds a predetermined value;
- means for subtracting said additional quantized error sample from said accumulated error; and
- means for encoding and transmitting said additional quantized error samples in succession with said periodic quantized error samples.

2. Apparatus as defined in claim 1 wherein said means for sampling and quantizing said accumulated error signal comprises first and second sampling means and fine and coarse quantizing means, said first sampling means and said fine quantizing means adapted to produce said periodic quantized samples and said second sampling means and said coarse quantizing means being cooperative with said means responsive to said error signal so that said coarse quantizer circuit produces an additional quantizer sample whenever said accumulated error exceeds said predetermined value.

3. Apparatus as defined in claim 1 further comprising:
- means responsive to said additional samples for omitting a preceding periodic sample from the encoded signal;
- means for interpolating the magnitude of said omitted sample by averaging preceding and succeeding samples; and
- means for producing a signal representing the error between said interpolated value and said actual value of said omitted sample to adjust said accumulated error signal.

4. A receiver system in combination with the transmitter of claim 1 comprising:
- means for detecting said additional transmitted error samples;
- means cooperative with said detection means for decoding said additional and said periodic encoded samples in succession; and
- means for filtering said decoded samples to reconstruct said original analogue signal.

5. In a predictive coding system which transforms an analogue to a digital signal by periodically sampling and quantizing the changes in the analogue signal, apparatus which extends the effective range of the quantizing circuit in said system comprising:
- means for generating additional quantized samples of the changes in said analogue signal whenever said changes exceed a predetermined threshold;
- means for coordinating the additional samples with corresponding periodic samples so that their sum represents the change which exceeded said threshold level in said analogue signal; and
- means for successively encoding said periodic and additional quantized samples.

6. Apparatus as defined in claim 5 further comprising:
- means responsive to said additional samples for omitting a preceding periodic sample from the encoded signal;
- means for interpolating the magnitude of said omitted sample by averaging preceding and succeeding samples; and
- means for producing a signal representing the error between said interpolated value and said actual value of said omitted sample to adjust succeeding samples in compensation for the omission of said interpolated sample.

7. A receiver system in combination with said coding system in claim 5 comprising:
- means for decoding the portions of said signal corresponding to the periodic samples;
- means for detecting and decoding said additional samples as they occur successively in the received signal;
- means for filtering the decoded signal by summing said additional samples with succeeding periodic samples to reproduce the changes in the original analogue signal.

8. Receiver apparatus in combination with claim 5 comprising:
- means for decoding the portions of said encoded signal corresponding to the periodic samples;
- means for detecting and decoding the portions of said decoded signal corresponding to said additional samples;
- means responsive to said additional samples for reconstructing said omitted periodic samples by interpolating the value between preceding and succeeding received samples;
- means for inserting said interpolated samples in time sequence with said periodic and additional received samples; and
- means for filtering the resultant samples to reconstruct said original analogue signal.

9. A transmission system comprising:
- a source of an analogue information signal;
- filtering means for emphasizing the changes in said signal;
- first sampling means for sampling the signal at the output of said filtering means;
- means for obtaining an accumulated error signal, second sampling means for sampling said error signal at periodic intervals and means for quantizing said error samples, said accumulated error signal being formed by subtracting the quantized samples of said error signal from the samples of said first sampling means;

means responsive to said accumulated error signal for generating an additional sample of said error signal when said accumulated error exceeds a predetermined threshold;

means for subtracting said additional quantized error sample from said accumulated error;

means for encoding said additional and periodic quantized error samples;

means for storing said additional and periodic encoded samples in succession; and means cooperative with said storage means for transmitting said encoded samples in succession.

10. A receiver system in combination with claim 1 comprising:

storage means for storing said transmitted digital signal;

means cooperative with said storage means for decoding said periodic encoded samples in succession;

means for detecting said additional encoded error samples;

means cooperative with said detection means for decoding said additional error samples in succession with said periodic encoded samples;

second filtering means having a characteristic the inverse of that of said first filtering means for filtering said decoded error samples; and third filtering means for filtering the output of said second filtering means to reconstruct said original analogue signal.